E. T. MEAKIN.
APPARATUS FOR PRODUCING FISH MEAL.
APPLICATION FILED JAN. 24, 1918.
1,421,283.
Patented June 27, 1922.
4 SHEETS—SHEET 4.
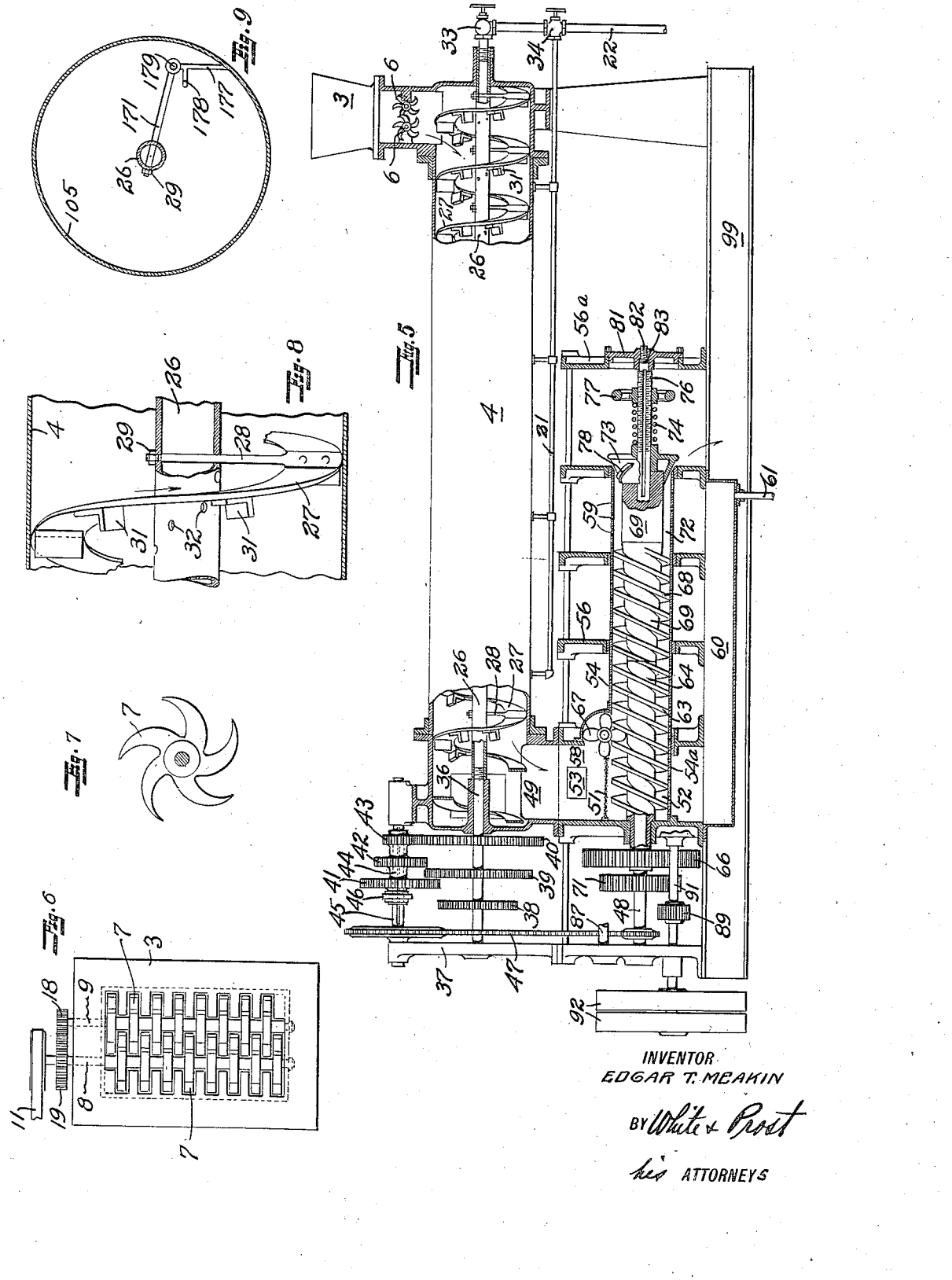
INVENTOR
EDGAR T. MEAKIN
BY White & Prost
his ATTORNEYS

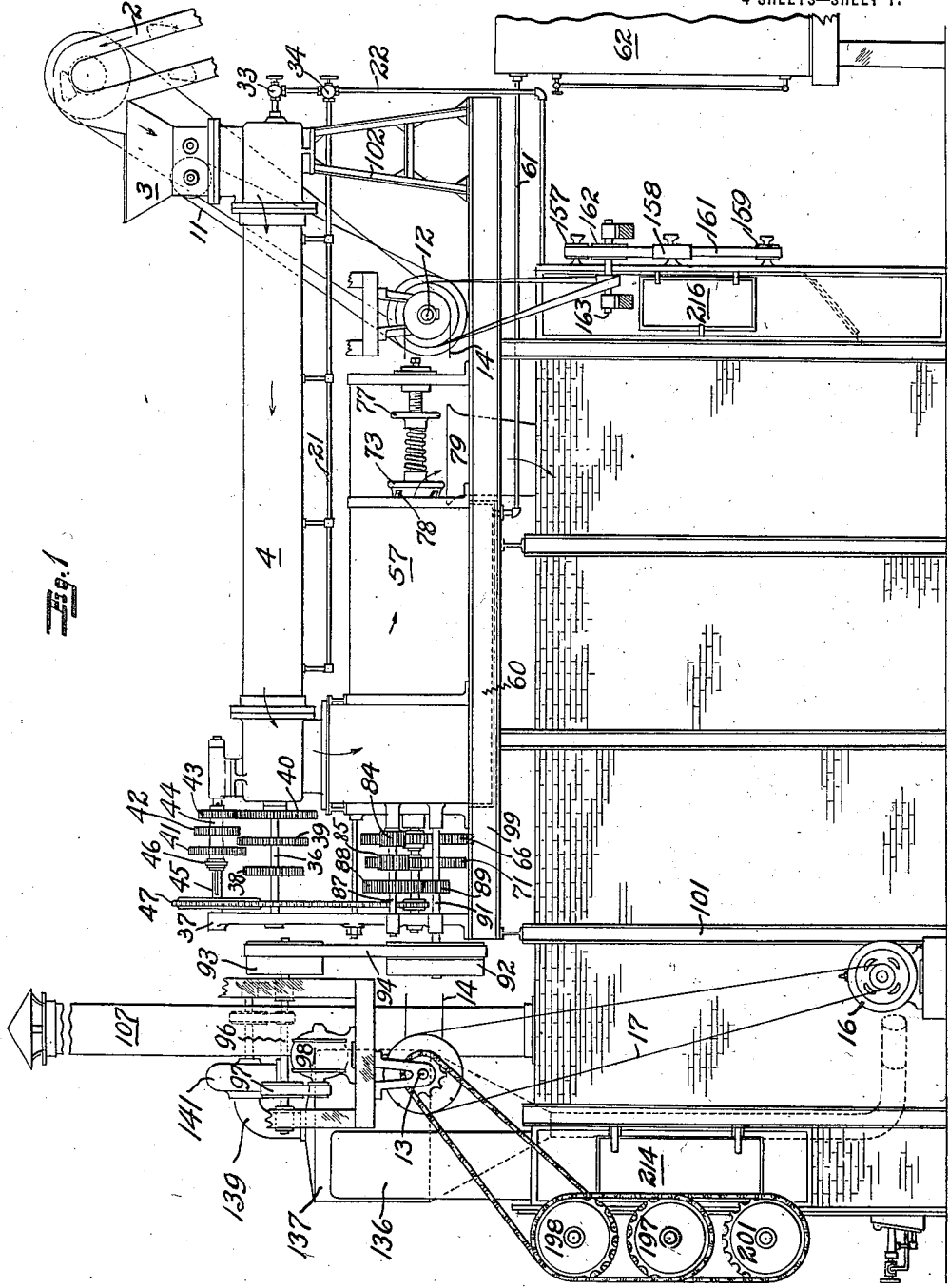

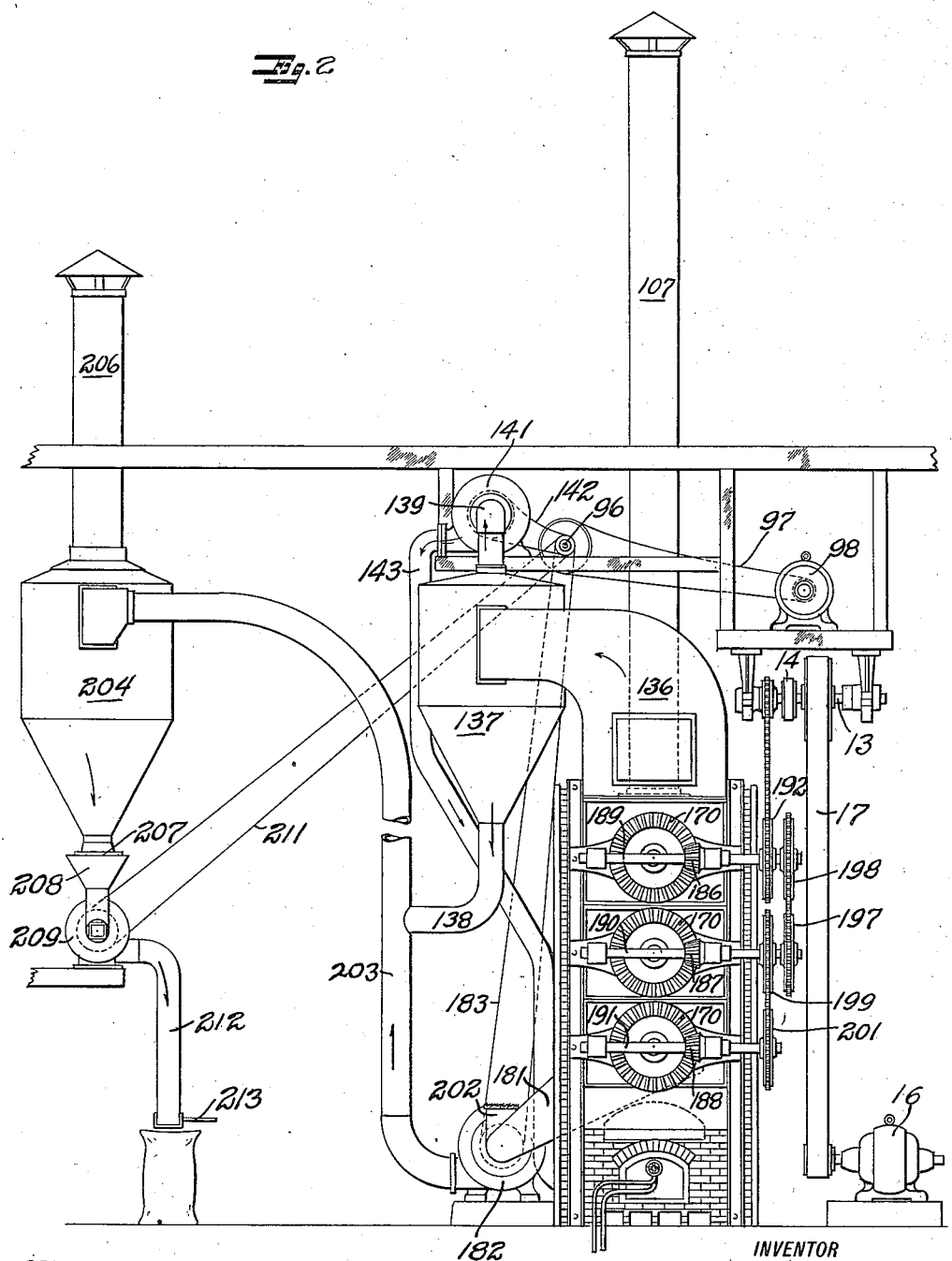

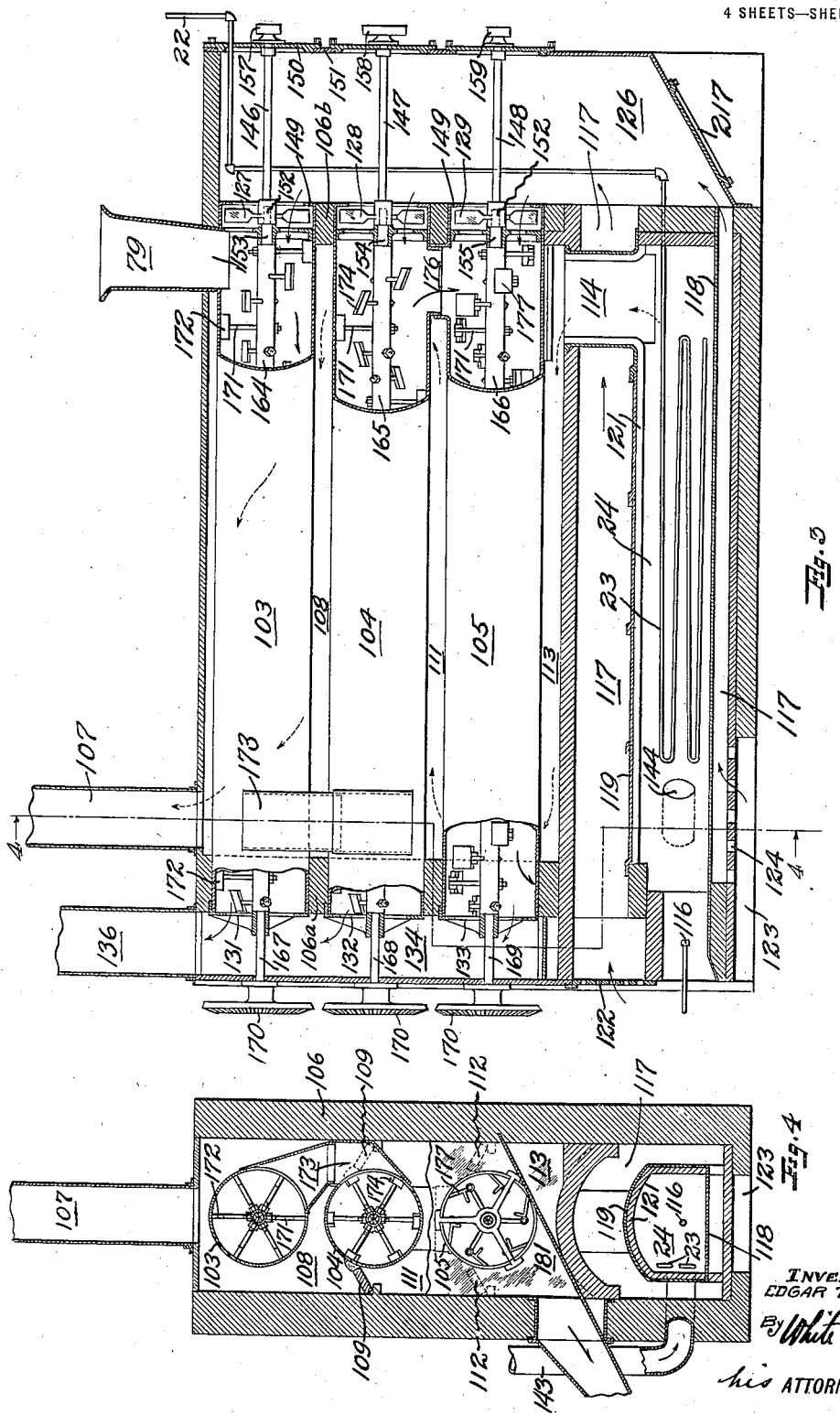

UNITED STATES PATENT OFFICE.

EDGAR T. MEAKIN, OF BERKELEY, CALIFORNIA.

APPARATUS FOR PRODUCING FISH MEAL.

1,421,283.  Specification of Letters Patent. Patented June 27, 1922.

Application filed January 24, 1918. Serial No. 213,452.

*To all whom it may concern:*

Be it known that I, EDGAR T. MEAKIN, a citizen of the United States, and a resident of Berkeley, county of Alameda, and State of California, have invented a new and useful Apparatus for Producing Fish Meal, of which the following is a specification.

My invention relates to an apparatus for producing a poultry feed and fertilizer from fish or fish trimmings.

An object of my invention is to provide an apparatus for treating fish or the trimmings and refuse from fish canneries to produce a poultry food and fertilizer free from carbonized material.

Another object of my invention is to provide an apparatus wherewith the process herein described and also set forth in my copending application Serial Number 261,603 can be continuously carried on.

The invention possesses other objects and features of advantage, some of which, with the foregoing, will be set forth in the following description of the preferred process and the preferred embodiment of means which is illustrated in the drawings accompanying and forming part of the specification. It is to be understood that I do not limit myself to the showing made by the said description and drawings, as I may adopt variations thereof within the scope of my invention as set forth in the claims.

Referring to the drawings:

Figure 1 is a side elevation of a complete fish meal plant.

Figure 2 is a front elevation of the plant.

Figure 3 is a side elevation of the drier drums and furnace, portions being shown in section.

Figure 4 is a vertical sectional view of the drier and furnace, taken on the line 4—4, of Figure 3.

Figure 5 is a side elevation of the cooker and press, portions being shown in section.

Figure 6 is a plan view of the cutter arranged in the entrance hopper of the cooker.

Figure 7 is a view showing the shape of the cutter knives.

Figure 8 is a detail showing the construction of the cooker screw.

Figure 9 is a detail showing the paddle preferred in the lower drying drum.

The raw material used in my process ordinarily comprises the trimmings and waste from a fish cannery, but whole fish unsuitable for human food such as the menhaden may also be used. The material including heads, bones, tails, and other organic matter is first divided in small pieces, then subjected to the action of live steam for a period varying from ten to sixty minutes according to the nature of the material. During this time the material is constantly tumbled about or agitated so that every particle is thoroughly cooked and the oil cells broken up. The cooked material is then subjected to heavy pressure while hot. This removes a large part of the water and most of the oil, which are allowed to drain away.

Later the oil is separated and is refined and used for lubrication, making soap, and for other purposes. An average of about fifteen gallons of oil is produced from one ton of raw material. The remainder of the liquid is clarified, evaporated and otherwise treated to form glue.

When the material leaves the press, it still contains from 50% to 60% water, and this is reduced by tumbling or agitating the material in a series of heated receptacles through which currents of hot air flow. The air is heated by contact with the hot walls of a furnace and is therefore clean and fresh, whereas air from a furnace or fire box direct is mixed with soot, and gases of combustion, both of which would contaminate the material. The application of heat from the receptacles and from the hot air currents evaporates the moisture which is then carried out by the current. Thus direct contact with intense heat or incandescent gases is avoided, so that no carbonization of material occurs. After undergoing this treatment for twenty to thirty minutes, the material contains about eight per cent of oil and less than ten per cent of water; that is, it is substantially dry.

The material is next cooled, preferably by currents of cold air, and is then ground into meal and sacked. The material may be ground before cooling and if desired the grinding may be omitted.

According to the nature of the material, about one ton of meal is produced from three to five tons of raw fish or scrap. The fish meal makes an excellent poultry feed, and unlike other feeds made from similar material, it is found that the poultry like the fish meal made according to my process, probably on account of its freedom from carbonized particles and absorbed odors and its appetizing appearance, which is not unlike that of whole wheat flour. The meal is also a valuable fertilizer because of its richness in nitrogenous and phosphatic elements.

For accomplishing each of the steps set forth above I have devised appropriate means, and this apparatus will now be described under topic headings as follows.

Cooker.

The raw material is fed by the conveyor 2, Figure 1, into the hopper 3 arranged at one end of the cylindrical cooker drum 4, where it is caught by the revolving knives 6 and finely divided. The cutter knives comprise a hub having a number of preferably curved arms 7, Figure 7, projecting radially therefrom. The knives are arranged in two series upon the shafts 8 and 9, Figure 6, the blades of each series projecting between the blades of the other series. The shaft 8 is driven by the belt 11 from the shaft 12, Figure 1, which is in turn driven from the shaft 13 by the belt 14. A motor 16 or other suitable prime mover drives shaft 13 by belt 17. The shaft 9, Figure 6, is driven by gear 18 in mesh with a relatively larger gear 19 on shaft 8 so that the two series of knives rotate at different speeds.

Live steam is admitted into the cooker drum 4 from the pipe 21 which is connected to the pipe 22 rising from the steam coil 23 arranged in the fire box 24. Means are provided in the cooker for conveying the material therethrough and for agitating or stirring the material, and for still further subjecting it to the action of live steam. A hollow shaft 26 is disposed in suitable bearings at each end of the cooker drum, and a helically wound strip or plate forming a ribbon conveyor 27 disposed thereon by arms 28. The arms pass through one side of the shaft 26 as shown in Figure 8 and seat against the opposite side, where each is secured by a nut 29 threaded on a stud projecting from the end of the arm. At suitable intervals upon the screw 27 are fixed short plates 31 forming shelves or ledges which pick up bodily masses of material; and steam is played directly upon the material carried upon these ledges, from apertures 32 in the hollow shaft positioned radially opposite each ledge. Steam is supplied to the hollow shaft through suitable connection with the pipe 22. Valves 33 and 34 are provided in the pipe 22 for controlling the admission of steam into the hollow shaft 26 and directly into the drum 4.

The left end of the hollow shaft 26 (as viewed in Figure 5) is fixed upon a shaft 36 journaled in the end of the drum and in the frame 37. Variable speed means are provided for turning the shaft and hence the screw 27 at the desired speed. Three gears 38, 39 and 40 are fixed upon the shaft 36 and are adapted to be engaged by gears 41, 42 and 43 respectively, fixed upon the sleeve 44, splined and longitudinally movable upon the jack shaft 45. A yoke 46 operated by a suitable handle in the usual way serves to move the sleeve to engage the desired set of gears, or disengage the gears. The shaft 45 is driven by chain 47 from the shaft 48 of the press.

The speed of the conveyor is adjusted so that the length of time during which the material is passing through the drum is sufficient to thoroughly cook the material and break up the oil cells. At the end of its journey through the cooker drum the material falls through the passage 49 and the screen 51 into the end 52 of the press chamber. The screen 51 is designed to catch foreign material, which through carelessness or other cause may have been allowed to get into the cooker. An aperture, norally closed by the plate 53, provides an opportunity for removing any accumulations on the screen.

Press.

The press, Figure 5, consists of a bronze casing 54 suitably held in frames 56 and surrounded by a housing 57. Preferably the casing 54 is made in two parts, the portion 54ª being provided with the intake hopper 58 in which the screen 51 is placed and the main portion 54 comprising a cylindrical tube. Both portions of the casing are provided with a multiplicity of closely spaced small apertures 59, through which the free liquids and those pressed from the material drain into the catch basin 60, connected by pipe 61 to the tank 62, where the liquid separates by gravital forces, the oil floating on top.

Two screws are arranged in the press casing 54; one, a feed screw 63 having a hollow shaft 64 rotatable upon the shaft 48, is placed below the screen 51 and is driven by the gear 66. A stop-wheel 67 is suitably mounted at the entrance of the main portion of the casing 54, its arms projecting into the spaces between the flights of the screw. The stop-wheel prevents the packing of material between the flights and insures its forward movement toward the pressure screw 68, which is provided with a conical shaft 69 keyed to the shaft 48, upon which the screw 63 turns. The screw 68 is turned by the gear 71, and its speed of rotation is preferably higher than that of screw 63. Because of the conical form of shaft 69, the space enclosed by the flights grows progressively smaller as the material is forced along, causing a considerable part of the liquid content of the material to be squeezed out, the material packing into chamber 72 at the end of the pressure screw comprising only about 50% of water and 7% of oil.

Means are provided for extracting the compressed material from the chamber 72 and breaking up the packed mass of material, which then passes into the drier. An extractor 73 preferably of conical form is splined upon the shaft 48, the end projecting into the press casing 54. The extractor is resiliently held against the end of the shaft 69 by the spring 74 coiled about the threaded end 76 of the shaft 48. A hand wheel 77 screwed upon the threaded shaft-end 76 provides means for adjusting the tension of the spring 74 which therefore permits the extractor longitudinal movement out of the end of the casing in case the pressure of the material thereagainst should for any reason become excessive. Spaced about the surface of the extractor cone are threads or spirally-disposed ridges 78 which catch the material and carry it from the chamber 72, from which it falls into the hopper 79 of the first drier drum. A suitable bearing for the shaft 48 is arranged in the plate 81 which is removable from the end frame 56ª so that the hand wheel 77 and extractor can be removed from the shaft. The end thrust of the shaft 48 is adjusted by the screw plug 82 bearing against hardened discs 83 arranged at the end of the shaft.

The two gears 66 and 71 which drive the feed screw 63 and the pressure screw 68 respectively are in turn driven by pinions 84 and 85 arranged on the shaft 87. The shaft 87 is driven by gear 88 thereon, in mesh with pinion 89 on the shaft 91 on the outer end of which are tight and loose pulleys 92. These pulleys are driven from pulley 93 by belt 94 which may be shifted as desired to operate or interrupt the operation of the cooker and press. The pulley 93 is mounted on the jack shaft 96 driven by the belt 97 from the motor 98.

The press is supported upon the I-beams 99, in turn supported by the vertical members 101, and the cooker is supported at one end upon the frame of the press and at the other end by the frame 102 resting on the I-beams 99.

Drier.

The drier consists of three drums 103, 104 and 105 through which the material successively passes. The drums are arranged, one above the other within a suitable housing 106 and preferably lie below the press. The drums are supported at their ends in the housing 106 so that the surface of the drums is free, and provision is made for circulating the hot gases from the fire box 24 around the drums before they escape into the stack 107.

Provision is also made for passing clean heated air through the drums in contact with the material to assist in evaporating the moisture and to carry it off; the upper drum which receives the wet material from the press receiving the hottest air.

The upper drum 103 and the upper portion of the middle drum 104 lie in the chamber 108 formed in the housing 106 by the partition walls 109, which extend longitudinally of the drum from the end wall 106ª of the housing nearly into contact with the opposite wall 106ᵇ, leaving a passage through which the fire box gases rise into the chamber 108 from the chamber 111, formed between the walls 109 and similar walls 112 arranged along the sides of the lower drum 105. This wall extends from end wall 106ᵇ (right of Figure 3) nearly into contact with end wall 106ª, where a passage is left for the gases to flow into the chamber 111 from the chamber 113 in which the lower portion of drum 105 lies. At the opposite end of this chamber, passage 114 connects it with the rear end of the fire box 24 in which an oil burner 116 is suitably arranged. Hot gases from the burner flowing through the passage 114, thus pass into successive contact with the outside surfaces of the drums, imparting heat thereto and finally discharging from the end of chamber 108 into the stack 107. It will be observed that at no time does any of the flame, smoke or gases come into contact with the material being treated, and this is highly important if a clean product and one free from carbonized material is to be obtained. The course of the gases from the fire box is shown in Figure 3 by dotted arrows.

The fire box 24 lies in a chamber 117 which surrounds the fire box for its entire length. The walls of the fire box are comparatively thin, so that heat is radiated therefrom on all sides to raise the temperature of the air flowing through the chamber. Since the bottom wall 118 of the fire box is less subject to the intense heat of the burner than the upper wall 119, it may conveniently be made of quite thin plate. The upper and side walls, however, are preferably lined with a refractory material 121. Air is admitted into the air heating chamber 117 preferably both above the fire box through apertures 122 and below the fire box through passage 123 and apertures 124. From the chamber 117 the heated air passes into the hot air chamber 126, Figure 3, arranged at the end of the housing 106 and enclosing the open ends of the drier drums 103, 104 and 105 into each of which the heated air is blown by fans 127, 128 and 129, respectively. Passing through the drums, the heat of the air aids in evaporating moisture from the material in the drums, and the current of air sweeps the released water vapor along with it, out of the apertures 131, 132

132 and 133 in the ends of the drums 103, 104 and 105, respectively, into the exhaust chamber 134 and from thence by conduit 136 tangentially into the cyclone drum 137, Figure 2. In the cyclone drum any fine material which has been carried out of the drier drums falls into the conduit 138 and the air and vapor are sucked out of the top through conduit 139 by the centrifugal fan 141 driven by belt 142 from the shaft 96. From the fan the air and vapor flow downwardly through conduit 143 to the fire box, entering through aperture 144, Figure 3, at such an angle with the line of general movement of gases therethrough as not to interfere materially with such movement. Since such incoming gases mingle with the flames and incandescent gases of the fire box, finely divided material entrained therein and all odors are consumed and the remainder circulates with the fire box gases about the drums and is finally discharged into the stack 107. The course of the heated air from the chamber 117 through the drums and into the fire box is indicated by full light line arrows in Figures 3 and 2.

The fans 127, 128 and 129 which blow the heated air into the drums are mounted on shafts 146, 147 and 148, respectively, in the ends of the drums 103, 104 and 105, respectively, and within the flanges 149, the function of which is to prevent back currents from the drums which tend to carry fine particles of material out into the hot air box. The outer ends of the shafts are journaled in suitable bearings in plates 150 removably secured to the end wall 151 of the hot air box. The inner ends are journaled on studs 152 projecting from the shafts 153, 154 and 155, respectively. Pulleys 157, 158 and 159 are fixed on the outer ends of the shafts 146, 147 and 148, respectively, and these pulleys are driven to turn the fans by a belt 161, Figure 1, passing around the upper and lower pulleys 157 and 159, one reach of the belt being carried inwardly and around the pulley 158. Since this will result in turning the shaft 147 in a direction contrary to that of the other two fan shafts, the blades of the fan 128 are given a correspondingly reversed slant so that all the fans deliver air in the same direction. One reach of the belt 161 is also passed over a driving pulley 162 on the jack shaft 163 which in turn is driven by the shaft 12. The speed of the fans 127 and 129 is preferably about 1000 R. P. M., but the pulley 158 is twice the diameter of the pulleys 157 and 159 so that fan 128 has a speed of 500 R. P. M. The reason for this is that in the upper and lower drums the current of heated air is in the same direction as the movement of material, whereas in the middle drum 104 the current of air is opposed to the movement of the material and the velocity of the air is, therefore, correspondingly reduced so that the relative movement of air and material in all three drums is about the same.

The course of the material through the drums and its treatment therein will next be considered. Arranged in the drums 103, 104 and 105 are hollow shafts 164, 165 and 166 supported in suitable bearings at the rear (right of Figure 3) by the short extension shafts 153, 154 and 155 respectively, and at the front by extension shafts 167, 168 and 169 respectively, on which the bevel gears 170 for turning the shafts are fixed. The shafts 164, 165 and 166 are formed hollow for lightness and strength, and arms 171 spirally spaced about the shaft are attached thereto in the same manner that arms 28 are attached to shaft 26, Figure 8. A paddle or scraper is provided on each arm 171, but the function and form of the scrapers in each of the three drums differ somewhat from the others.

In the upper drum the scraper is preferably a flat plate 172 secured on the end of the arm 171 and lying in a plane cutting the axis of the shaft 164. The edge of the scraper clears the inside of the drum 103 by a small amount. The shaft 164 is rotated at a speed of about 15 R. P. M. and the paddles or scrapers 172 tumble the material about the drum, exposing all portions to the hot air blowing therethrough and to the hot sides of the drum. The material entering the drum through the hopper 79 is carried forward in the direction shown by the heavy single barbed arrows, Figure 3, by the action of the scrapers and also by the current of air from the fan 127 which causes each particle dropping from the scrapers to fall forward of its normal line of descent. If desired the scrapers may be given a slight inclination to exert a more rapid feeding action upon the material; and those at the extreme front end are in fact given such inclination to feed material lodging therein, backward into the conduit 173, which connects the upper drum to the middle drum. The conduit 173 opens into the side of the drum 104, so that material entering the drum will not be caught and carried out of the end thereof by the current of heated air.

Since the movement of material in the middle drum 104 is opposed to the current of air passing therethrough, the scrapers 174 in this drum are inclined sufficiently to cause a rearward movement of the material, which, upon reaching the rear end falls through the passage 176 into the rear end of the lower drum 105, where it again begins a forward movement under the influence of the current of air. Since the gases from the fire box come first in contact with the lower portion of this drum, its walls become very hot, and consequently will parch or burn the material if it is allowed to remain in contact therewith too long. The scrapers in this drum are therefore devised to clean off the walls of adhering particles with every revolution. Figure 9 illustrates the structure of the scraper, which comprises a shovel-like blade 177 provided with a back or ledge 178. The blade is pivoted on the arm by the pin 179 and the outer edge swings outwardly in operation, pressing against the wall of the drum and cleaning the material therefrom. The blade lies in a short chord so that there is no danger of the blade catching or jamming against the sides of the drum.

When the material reaches the forward end of the lower drum, it has been in the drier drums from twenty to thirty minutes and is substantially dry, containing less than ten per cent moisture; that is, it has been deprived of the excess of water above the normal content when exposed to the atmosphere. From the drum 105 the dry material is discharged into the conduit 181, opening out of the side thereof, and passes into the centrifugal blower 182 driven from the shaft 96 by the belt 183.

The bevel gears 170 fixed on the shafts 167, 168 and 169 are driven by pinions 186, 187 and 188, fixed on shafts 189, 190 and 191, respectively. The upper shaft 189 is also provided with a sprocket 192 driven by chain from the counter shaft 13, in turn driven by the belt 17 from the motor 16. The shaft 190 is provided with a sprocket 197 driven by chain from sprocket 198 on shaft 189, and also with a sprocket 199 connected by chain to sprocket 201 on shaft 191. Thus, the upper shaft 189 is the drive shaft for the shaft 190 and the latter is the drive shaft for the lower shaft 191. The size and speed of the various pulleys and sprockets are such as to give the shafts 167, 168 and 169 a speed of about 15 R. P. M.

*Cooling, elevating and grinding.*

Owing to its oil content and its high temperature when discharged from the drier, the material is peculiarly susceptible to spontaneous combustion, and means are, therefore, provided for cooling it. The centrifugal fan 182 is provided with a screened cold air intake 202, through which cold air is drawn into the fan with the product from the drier drums. The material entrained in the cold air is then blown upward through the conduit 203 into a cyclone drum 204, the air passing out of the stack 206 and the material settling into the bottom from which it discharges through the screen 207 into the hopper 208 of the grinder 209 driven from the shaft 96 by the belt 211. Any material in the conduit 138 will also be drawn into the cold air stream in conduit 203 and pass therewith into the cyclone 204.

In the grinder the material is reduced to a fine meal and is then discharged into sacks through the spout 212, the outlet of which is manually controlled by the lever 213. If desired, the grinding may be omitted and the product, which is more or less finely divided by the tumbling it has undergone, sacked directly from the cyclone 204. With the apparatus herein described in continuous operation, an output of from one to one and one-fourth tons of fish meal per hour is secured.

Access to the exhaust chamber and to the hot air box is had through suitable doors 214 and 216, respectively, and a removable plate 217 is arranged in the bottom wall of the hot air box through which any material which accumulates therein may be removed.

It should be noted, finally, that only the heated clean fresh air from the chamber 117 surrounding the fire box contacts with the material in the drums, and that the gases of combustion, soot and dirt from the fire box 24 do not reach or contaminate the material at any time. In the claims I shall use the phrase "clean fresh air" to define air free from soot, and gases of combustion.

I claim:

1. In an apparatus for preparing fish meal, means for cooking the material, a stationary drum into which the cooked material discharges, paddles for tumbling said material in said drum, and a fan at one end of said drum for blowing heated clean air through said tumbling material to reduce it to a state of substantial dryness.

2. In an apparatus for preparing fish meal, means for cooking the material, a drum into which the cooked material discharges, means for tumbling said material in said drum, means for blowing heated clean air through said tumbling material to reduce it to a state of substantial dryness, and means for entraining said material in a current of cold air to cool it.

3. In an apparatus for preparing fish meal, means for cooking the material, means for extracting a portion of the liquid from said material, a series of connected drums into the first of which said material discharges from said liquid extracting means, means for tumbling said material in said drums and feeding said material therethrough, a fire box, means for heating the outside of said drums with the hot product from said fire-box, an air heating chamber surrounding the fire-box, and means for blowing currents of heated clean air from said chamber through said tumbling material.

4. In an apparatus for preparing fish meal, means for cooking the material, means for extracting a portion of the liquid from said material, a drum into which said material is discharged from said liquid extracting means, means for tumbling said material in said drum, means for heating the outside of said drum, means for blowing a current of heated clean air through said tumbling material to reduce it to a state of substantial dryness, and means for entraining said material in a current of cold air to cool the same.

5. In an apparatus for preparing fish meal, means for cooking the material, means for extracting a portion of the liquid from said material, a hot drum into which said material is discharged from said liquid extracting means, means for tumbling said material in said drum, means for blowing heated clean dry air through said tumbling material to reduce it to a state of substantial dryness, and means for grinding said material to meal.

6. In an apparatus for preparing fish meal, a drum having apertured ends, a shaft rotatably mounted in said drum, scrapers mounted on said shaft, inlet and outlet passages for material to be treated in said drum, a fan arranged in one end of the drum, means for revolving said shaft whereby said scrapers tumble said material about said drum, means for revolving said fan to blow a current of air through said drum, a fire-box, and a chamber surrounding the fire-box for heating said air.

7. In an apparatus for preparing fish meal, a drum having apertured ends, a shaft rotatably mounted in said drum, scrapers mounted on said shaft, inlet and outlet passages for material to be treated in said drum, a fan arranged in one end of the drum, means for revolving said shaft whereby said scrapers tumble said material about said drum, means for revolving said fan to blow a current of air through said drum, a fire-box, a chamber surrounding the fire-box for heating said air, and means for conducting the hot product from the fire-box around the outside of the drum.

8. In an apparatus for preparing fish meal, a drum having apertured ends, a shaft rotatably mounted in said drum, means on said shaft for tumbling the material in said drum, a fan mounted adjacent one end of said drum, means for revolving said fan to blow air through said drum, and a flange on said drum adjacent said fan for preventing back currents from said drum.

9. In an apparatus for preparing fish meal, a drum, a fan arranged adjacent one end of the drum, means for revolving said fan to blow air through said drum, and means for preventing back currents from said drum.

10. In an apparatus for preparing fish meal, a drum, a shaft rotatably mounted in said drum, means on said shaft for tumbling material in said drum, means for revolving said shaft, a stud on the end of said shaft, a fan journaled on said stud, and means for rotating said fan to blow air through said drum.

11. In an apparatus for preparing fish meal, a drum, a shaft rotatably mounted in said drum, arms spirally disposed on said shaft, a scraper having a ledge arranged thereon pivoted to each of said arms, and means for rotating said shaft.

12. In an apparatus for preparing fish meal, a drum for the reception of material to be treated, means for tumbling said material about said drum, a fire box, an air heating chamber surrounding said fire box, means for blowing currents of hot air from said heating chamber through said drum, and means for circulating the hot products from said fire box around the outside of said drum.

13. In an apparatus for preparing fish meal, a drum for the reception of material to be treated, means for tumbling said material about said drum, a fire box, an air heating chamber surrounding said fire box, means for blowing currents of hot air from said heating chamber through said drum, means for circulating the hot products from said fire box around the outside of said drum, means for permitting said material to discharge from said drum and means for cooling said material.

14. In an apparatus for preparing fish meal, a drum for the reception of material to be treated, means for tumbling said material about said drum, a fire box, an air heating chamber surrounding said fire box, means for blowing currents of hot air from said heating chamber through said drum, means for circulating the hot products from said fire box around the outside of said drum, means for permitting said material to discharge from said drum and means for discharging said material from said drum into a current of cold air.

15. In an apparatus for preparing fish meal, a drum for the reception of material to be treated, means for tumbling said material about said drum, a fire box, an air heating chamber surrounding said fire box, means for blowing currents of hot air from said heating chamber through said drum, means for circulating the hot products from said fire box around the outside of said drum, means for permitting said material to discharge from said drum, and means for simultaneously elevating and cooling said material.

16. In an apparatus for preparing fish meal, a housing, a fire box in said housing, an air heating chamber surrounding said fire box, a drum arranged in said housing, means for feeding material into one end of said drum, means for tumbling the material in said drum, a second drum in said housing, means connecting the discharge end of said first drum into the side lateral wall of said second drum, means for tumbling material in said second drum and for feeding said material through said drum, a third drum in said housing connected to said second drum, means for tumbling material in said third drum and for scraping said material from the walls of said drum, means for blowing currents of hot air from said heating chamber through said drums, and means for circulating the hot products from said fire box around the outside of said drums.

17. In an apparatus for preparing fish meal, a drum for the reception of material to be treated, means for tumbling said material about said drum, a fire box, an air heating chamber surrounding said fire box, means for blowing currents of hot air from said heating chamber through said drum, means for circulating the hot products from said fire box around the outside of said drum, and means for passing the air discharging from said drum into said fire box.

18. In an apparatus for preparing fish meal, a drum for the reception of material to be treated, means for tumbling said material about said drum, a fire box, an air heating chamber surrounding said fire box, means for blowing currents of hot air from said heating chamber through said drum, means for circulating the hot products from said fire box around the outside of said drum, and means for removing entrained particles of material from the air discharging from said drum.

19. In an apparatus for preparing fish meal, a cooker drum, a drier drum for the reception of cooked material, a fire box, an air heating chamber surrounding said fire box, means for blowing hot air from said heating chamber through said drum, means for circulating hot products from said fire box around the outside of said drum, and a steam coil in said fire box connected to said cooker drum.

20. In an apparatus for preparing fish meal, a plurality of connected drums, a fire box, an air heating chamber surrounding said fire box, means for blowing currents of air from said heating chamber through said drums, means for circulating products from said fire box around the outside of said drums, means in one of said drums for agitating the material and permitting the air currents therethrough to effect the movement of material therethrough, and means in another of said drums for agitating the material and effecting a feed thereof against the current of air flowing through said drum.

21. In an apparatus for preparing fish meal, a drum for the reception of material to be treated, means for tumbling said material about said drum, means for blowing a current of hot air through said drum, means for entraining said material from said drum in a current of cold air, and means for separating said material from said cold air current.

22. In an apparatus for preparing fish meal, a drum for the reception of material to be treated, means for tumbling said material about said drum, means for blowing a current of hot air through said drum, means for discharging said material from said drum into a current of cold air, means for removing entrained particles of material from the hot air passing through said drum and discharging the same into said cold air current, and means for separating said material from said cold air current.

23. In an apparatus for preparing fish meal, a series of three stationary drying drums arranged parallel to each other, a hot air chamber disposed across and opening into the drums of said series at one end, an exhaust chamber disposed across and opening into the drums of said series at the opposite end, means for blowing a current of air from said hot air chamber through each drum into said exhaust chamber, means for feeding material to be treated into the first drum of the series, means connecting the first drum adjacent one end to the adjacent end of the second drum and for connecting the second drum at its opposite end to the adjacent end of the third drum, means for raising material in the drums and allowing it to fall through the currents of heated air flowing through the drums, the material being moved through said drums by said last named means and by said air currents, and means for discharging material from the end of the third drum.

In testimony whereof I have hereunto set my hand at San Francisco, California, this 5th day of January, 1918.

EDGAR T. MEAKIN.

In presence of—
C. S. EVANS.